United States Patent [19]

Gautherot et al.

[11] Patent Number: 4,677,446

[45] Date of Patent: Jun. 30, 1987

[54] WATCHMAN'S CLOCK

[75] Inventors: Daniel Gautherot; Dominique Holtzer, both of Besancon, France

[73] Assignee: Flonic, Montrouge, France

[21] Appl. No.: 751,394

[22] Filed: Jul. 3, 1985

[30] Foreign Application Priority Data

Jul. 6, 1984 [FR] France ................................ 84 10733

[51] Int. Cl.$^{4}$ ........................ G01D 9/28; G01D 15/00

[52] U.S. Cl. ........................................ 346/52; 346/58; 346/144

[58] Field of Search ........................ 346/52, 58, 56, 81, 346/87, 88, 144

[56] References Cited

U.S. PATENT DOCUMENTS 934,038 9/1909 Burk ...................................... 346/58

973,383 10/1910 Prentiss ................................ 346/58

1,223,581 4/1917 Hardinge ............................. 346/56

*Primary Examiner*—Elliot Goldberg

*Assistant Examiner*—Mark Reinhart

*Attorney, Agent, or Firm*—Dale Gaudier

[57] ABSTRACT

The present apparatus concerns round monitoring and includes a portable recording device together with a plurality of keys for indicating different locations through which a watchman is to pass. In order to simplify the drive mechanism of the apparatus, the apparatus comprises a clock movement (20) having an hours shaft on which a disk (34) is mounted having time data print elements (36) disposed around its rear face. A strip of paper (50) is displaced between said print elements (34) and a print hammer (52).

7 Claims, 7 Drawing Figures

WATCHMAN'S CLOCK

The present invention relates to a watchman's clock.

BACKGROUND OF THE INVENTION

The purpose of such apparatus is to verify that a watchman who is supposed to perform a round under well-defined conditions, does effectively follow the specified path for the round and does, in fact, visit various locations at specified times.

In order to monitor such a round, the apparatus may comprise a recording device carried by the watchman together with a plurality of identification keys which are permanently fixed at various locations for which verifications is to be perform. When the watchman passes each of these locations, he inserts a key carrying location-identification means into the recording device. Actuating the device by said key causes the identity of the location and the time of passage to be recorded on a recording medium, with the time of passage being provided by a clock movement within the portable device. Periodically the data recording medium may be removed from the portable device in order to verify that the watchman has performed his rounds under the conditions laid down.

There are two main types of watchman's clocks, depending on the way in which the information concerning passage via a particular location and the time of said passage is recorded. In a first type of apparatus, the data medium which may be a disk or a tape, is driven continuously by the clock movement and data representative of each location is printed on the medium. The position of said recording relative to a pre-printed time mark on the medium indicates the time at which the corresponding passage took place. It can be seen that this type of recording suffers from the drawback of requiring large-sized recording medium. Further, the recording medium is used up as a function of elapsed time rather than as a function of the number of location checks performed. In addition, time resolution is low.

In another type of apparatus, the data medium is generally in the form of a tape and is moved by one step each time an identification key is used. Under the effect of key actuation, a mechanism prints the time as given by a clock movement together with the identity of the key location. This second type of apparatus has the advantage of using up less recording medium and thus of lasting longer between refills and of providing improved resolution. However, in this type of apparatus the drive chain connecting the clock (which may be mechanical or electronic) to the data printing means and also to external time-displaying means is relatively complex and fragile. Further, the printing means in such apparatus is constituted by reels having peripheral digits enabling hours and minutes or tens of minutes to be printed. The fabrication of such print wheels is expensive since complicated molds are required in order to allow the part to be unmolded. Preferred embodiments of the present invention remedy these drawbacks by providing round monitoring apparatus of the second type, i.e. of the type in which the data medium is moved only when a recording is to be made thereon, but in which the drive chain for printing said data is simplified and the print elements are capable of being fabricated at reduced cost.

The present invention provides apparatus for monitoring the times at which a watchman passes a plurality of given locations, the apparatus comprising a plurality of keys with each key being intended to be disposeed at a respective one of said locations and being provided with a print element capable of identifying said location, the apparatus further comprising a portable recording device provided with a recording strip for simultaneously recording data representative of one of said locations together with the time of passage at said location, said portable recording device comprising a clock movement having at least an hours shaft, a disk which is fixed in rotation about said shaft and having print elements disposed around the periphery of one its faces for printing time data, means enabling one of said keys to be inserted into said portable recording device and for positioning said identification element of said key therein, strip advancing means for causing said recording strip to advance by one step, said strip advancing means causing a new portion of said strip to be placed at each step, opposite to a print element on said disk and opposite to said identification element of said key, and means for causing simultaneous printing of the time data and of the identification element on said portion of the strip.

It can thus be seen that the print mechanism and the clock movement are very simple since they are restricted to a conventional clock movement and to a disk fixed to the hours shaft of the clock movement on which the print elements for printing time information are directly fixed or made. Additionally, since the print elements are fixed around the periphery of one of the faces of the disk, the disk can be molded without any particular problems.

BRIEF DESCRIPTION OF THE DRAWINGS

Embodiments of the invention are described by way of example with reference to the accompanying drawings, in which.

DETAILED DESCRIPTION OF THE PREFERRED EMBODIMENTS OF THE INVENTION

Figure 1:
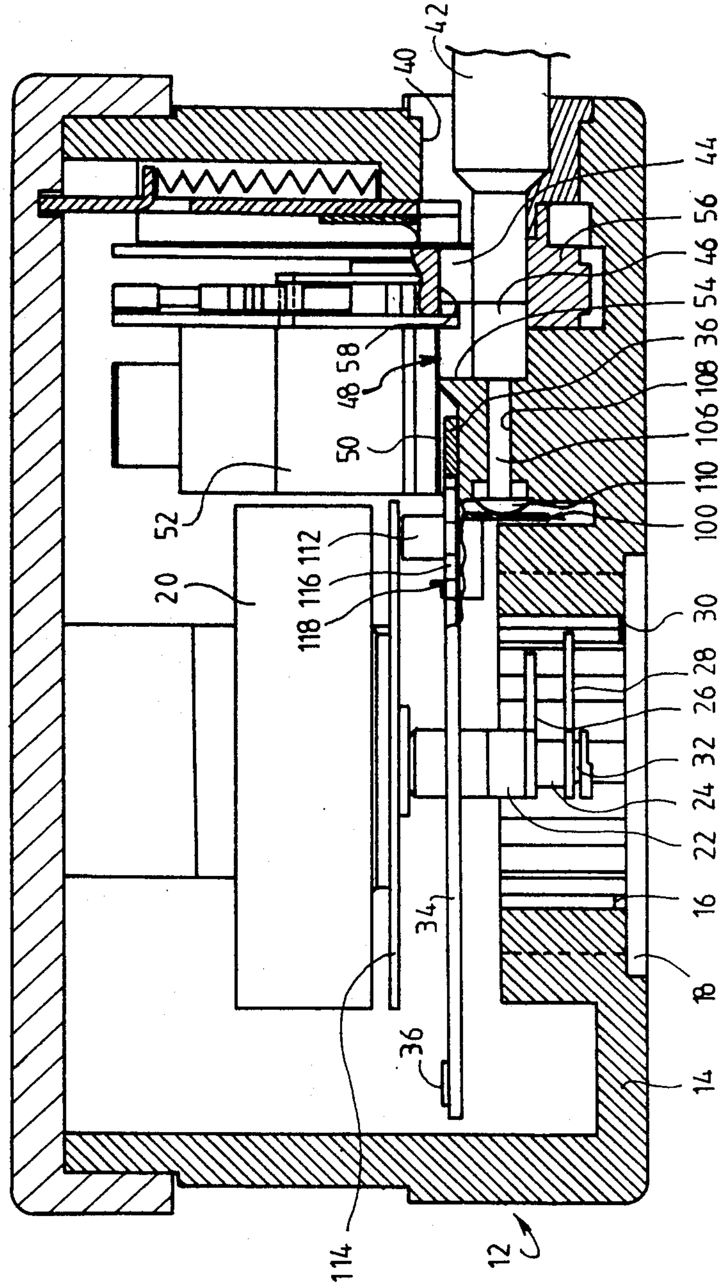
FIG. 1 is a vertical section through a portable recording device for round monitoring apparatus.
Figure 2:
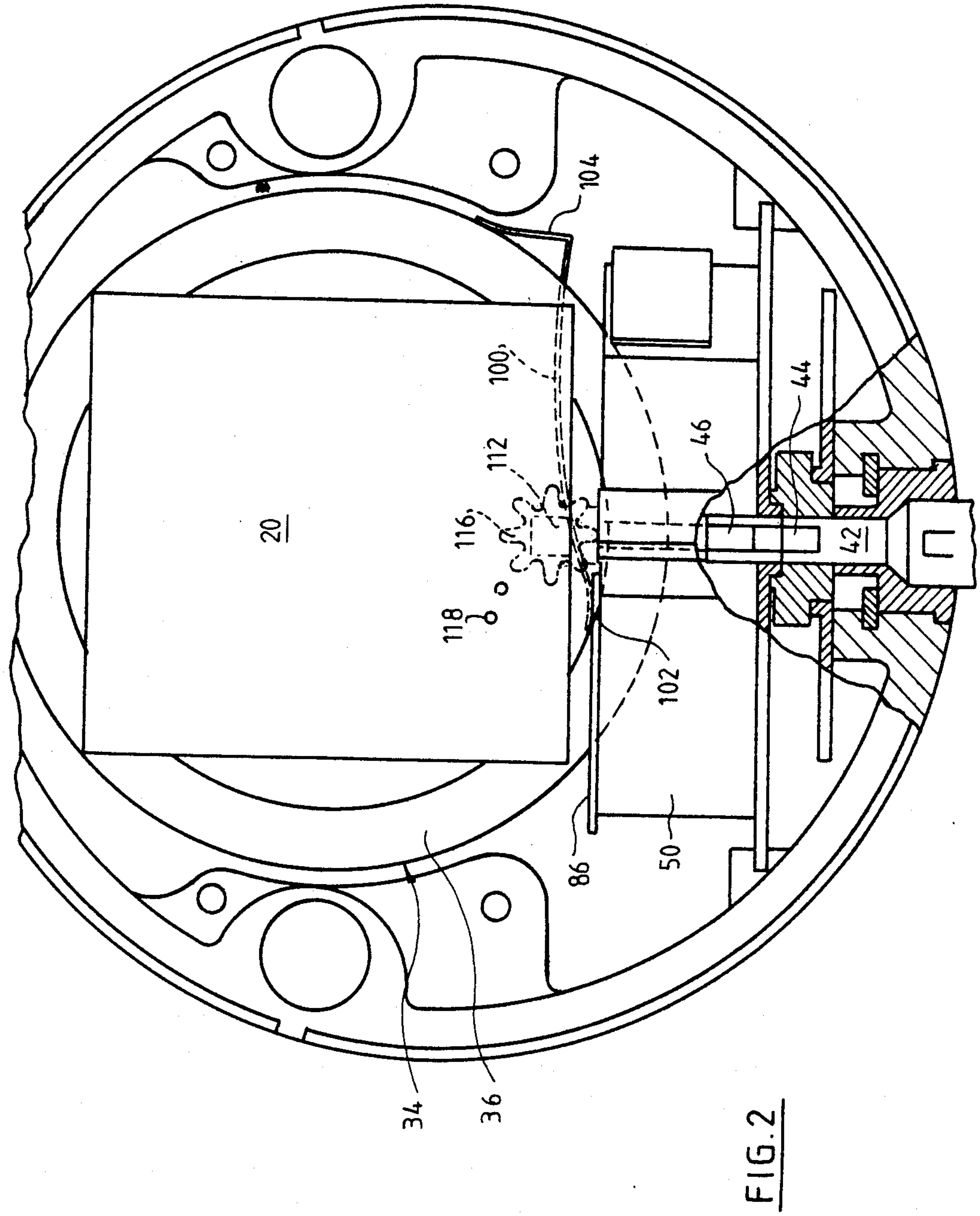
FIG. 2 is a plan view of the portable recording device, shown in partial section.

Reference is made initially to FIGS. 1 and 2 while describing the general organization of a portable recording device which constitutes part of a watchman's clock. The device comprises a housing 12 which is generally cylindrical in shape and which has a front face 14 which is pierced by a window 16 and closed by a glass 18. Inside the housing 12 there is a clock movement 20 of standard type having an hours shaft 22 and a minutes shaft 24. The clock movement may be of the mechanical or of the electrical type. Such movements are well-known and it is therefore pointless to described it in greater detail. An hours hand 26 and a minutes hand 28 are fitted to the ends of the shafts 2 and 24 respectively. These hands co-operate with fixed hours marks 30 provided on the inside face of the glass 18 or on the housing. The clock movement may also include a seconds shaft with a pointer 32 mounted on the end thereof to show that the mechanism is working. The user of the apparatus can thus check that it is working and that it tells the right time. The drive chain for displaying the time is thus very simple since it is merely a standard clock movement.

A disk 34 is mounted on the hours shaft 22 and is thus caused to rotate by the hours shaft 22. Printing elements bearing the overall reference 36 are mounted on the rear face around the periphery of said disk. These elements are disposed in a such a manner as to enable hours together with tens of minutes, for example, to be printed in a manner explained below. As can be seen more clearly in FIG. 4, these print elements may also include intermediate marks to indicate five-minute fractions, for example, or even shorter periods of time by interpolation from a fixed mark.

The side face of the housing 12 includes an orifice 40 suitable for receiving an identification key such as 42. The key 42 includes a bit 44 which is fixed to the body of the key and a moving bit 46 which is half-free to rotate at the end of the key 42. The second, or moving bit 46 has printing characters on its face 48 which are characteristic of the location in which the key is to be found, said characters may be constituted by a number, for example. As can be seen in FIG. 1, the print elements 48 on the key are disposed in the same plane as the print element 36 on the disk 34. The first, or fixed, bit 44 of the key is caused to rotate by turning the key and serves both to drive a strip of recording paper 50 in a manner explained below and also to actuate a print hammer 52. As can be seen in FIG. 1, the strip of print paper 50 moves in such a manner as to be above the print elements 36 on the disk 34 and the print elements 48 on the moving bit 46 of the key 42. Naturally, the strip 50 moves between these print elements 36 and 48 and the print hammer 52, which hammer is disposed opposite said print elements.

Figure 4:
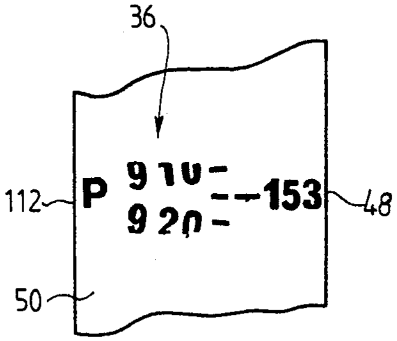
FIG. 4 is a view of a portion of the recording strip showing how time data is printed.

FIG. 4 shows a portion of the printed strip 50 on which the identification element of the key 42 has been recorded in the form of the number 153 (in this case) together with those print elements of the disk which were opposite the print head 52. In the FIG. 4 example this is shown as time data representative of 0910 and 0920.

It can be seen more clearly in FIG. 2 that the strip of recording paper 50 moves to pass to between the hammer 52 and the print elements 48 on the key and a portion of the print element 36 on the disk, which portion corresponds to the displayed time. The strip 50 is made from no carbon required (NCR) paper, i.e. paper on which the image of the print elements will effectively appear simply by virtue of the hammer 50 striking the strip against the print elements.

When the key 42 is fully engaged, the moving bit 46 is prevented from rotating by a slot 54 in the housing, while the fixed bit 44 is received in a pivoting block 56 having a slot 58 in which said fixed bit 44 is engaged.

Figure 3:
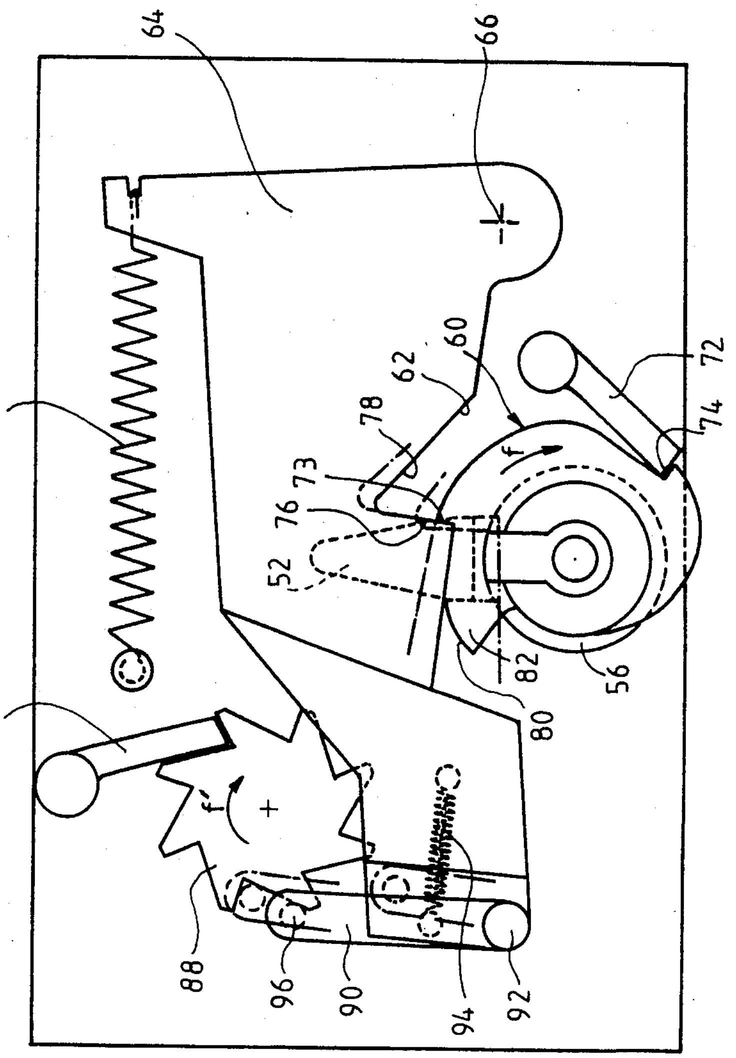
FIG. 3 is a detail view of a preferred embodiment of the mechanism enabling data to be printed and enabling the recording tape to be driven in steps.

Thus, when the key 42 is turned, the print element 48 on the moving bit 46 remains opposite the print head 52 while the fixed bit 44 causes the block 56 to rotate. As shown in FIG. 3, the block 56 is fixed to a cam 60 whose periphery co-operates with the lower edge 62 of a lever 64 which is mounted to pivot about an axis 66. The edge 62 of the lever 64 is kept in contact with the periphery of the cam 60 by means of a spring 68.

In FIG. 3, the block 56 is in a neutral position enabling the key to be inserted. It is partially held in this position by co-operation between a ratchet 72 and a notch 74 provided in the periphery of the cam 60. In addition, the ratchet 72 enforces rotation from this position in the directin marked by an arrow f. The bottom edge 62 of the lever 64 includes a cutout 78 and a projection 73 which, in the neutral position of the block, co-operates with a second notch 76 on the periphery of the cam. In the neutral position, the print hammer 72 is held slightly above the strip of paper 50. Beyond the notch 76 the periphery of the cam 60 defines a ramp 80 which terminated in a shaft drop 82. Beyond the drop 82 the cam has a second ramp 84 which terminates with the notch 74.

When the block 76 is made to rotate from its neutral position in the direction marked by the arrow f, the ramp 80 lifts the lever 76 until the drop 82 comes into contact with the projection 73. Beyond this angular position of the block, the drop 82 on the cam and the cutout 78 in the lever 64 cooperate to allow the lever to move sharply downwards, thereby causing the print hammer to strike the print elements. One end of the printing medium paper strip 50 is fixed to a drive reel 86. The reel 86 is itself fixed in rotation to a star wheel 88. The rotary movements of the lever 64 under the control of the cam 60 also serve to rotate the star wheel 88 to cause the paper strip 50 to advance by one step. In order to do this, a ratchet 90 is pivotally pointed at the free end 92 of the lever 64. A return spring 94 urges the end 96 of the ratchet 90 against the teeth of the wheel 88. In addition, a second ratchet 98 prevents the star wheel 88 from reversing against the direction market by an arrow f' (see FIG. 3). Thus, when the lever 64 moves down with the drop 82 being received in the cutout 78, the end 96 of the ratchet lever 90 passes under the following tooth of the wheel 88. When the main lever 64 is lifted, the end 96 of the ratched lever 90 comes into contact with said following tooth and causes it to rotate through an angle corresponding to one tooth. This rotation causes the strip of paper 50 to advance by one step. The apparatus is then ready for the following record. When the block has been returned to the neutral position shown in FIG. 3, the key may be removed.

As can be seen in FIGS. 1 and 2, the apparatus also includes a mechanical system for taking up the angular offset of the print disk as provoked by the operating slack of the clock movement 20. This mechanical system comprises a resilient blade 100 having a fixed end 102. When the blade 100 is at rest its other end 104 is free. When the key 42 is inserted the end of the key pushes a rod 106 which is slidably mounted in an orifice 108. The end 110 of the rod 106 deforms the resilient blade 100 so that its end 104 rubs against the rim of the disk 34 thereby taking up the angular offset of the print disk as caused by the operational slack of the clock movement 20 (see FIG. 2). This rubbing action continues until the key is withdrawn.

The apparatus may further include additional print means for distinguishing between a.m. and p.m. This additional print means 112 is pivotally mounted about an axis fixed to the fixed plate 114. Said additional print means may include the letters A and P, for example. The member 112 is fixed in rotation with a toothed wheel 116. The wheel 116 is capable of co-operating with members 118 fixed to the disk 34. Each time the disk 34 rotates through one complete turn, i.e. at the end of each 12-hour period, the unit 112 rotates through one-fourth of a turn. Thus the letters A and P appear alternately opposite the print head for printing onto the strip of paper 50.

Figure 5:
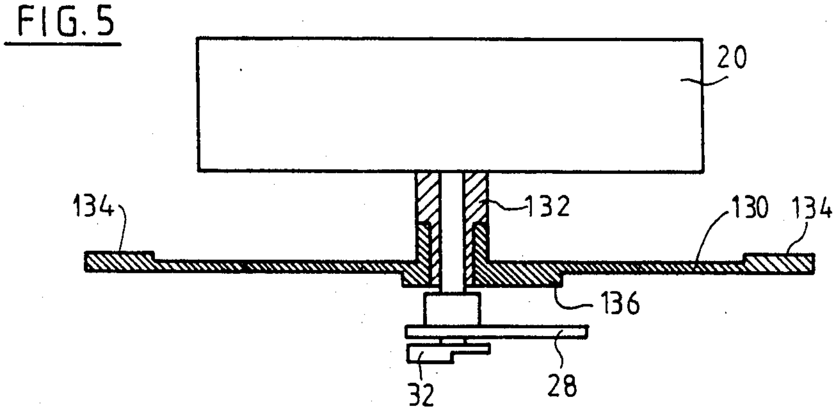
FIG. 5 is a view of a portion of one embodiment of means for displaying time.

FIG. 5 shows a variant embodiment of the portable device, and more particularly of the time display means. In this embodiment, the disk 130 fixed to the hours shaft 132 still bears print elements 134 for printing time information around the periphery of its rear face.

However, on its front face, i.e. the face visible through the glass, the disk 130 includes a mark 136 for displaying the hours and which replaces the hours hand. However, the minutes hand and the seconds pointer for showing that the clock movement is working are both retained.

Figure 6:
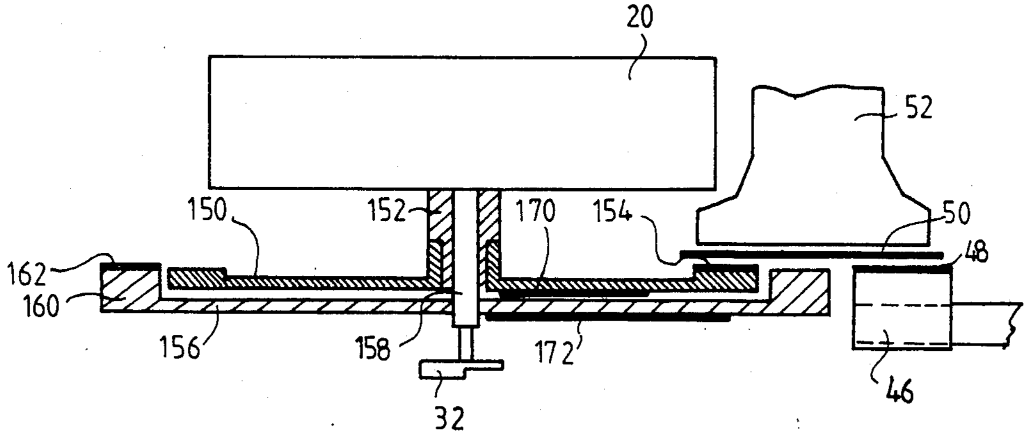
FIG. 6 shows a variant embodiment of the means for printing the time data.

FIG. 6 shows another embodiment of the means for printing the time. A first disk 150 is fixed in rotation on the hours shaft 152 of the clock movement. The periphery of the face of the disk 150 looking towards the movement includes print elements for the numbers of hours, e.g. the elements 154. A second disk 156 is fixed in rotation on the minutes shaft 158 of the clock movement 20. The disk 150 is situated between the clock movement 20 and the disk 156. In addition, the disk 16 is transparent and includes a thick rim 160 fitted with minute printing elements 162. The thickness of the rim 160 is such that the print elements 154 and 162 are disposed in a common plane perpendicular to the shaft 152 and 158. FIG. 6 also shows, in simplified manner, the identification element 48 fixed to the moving bit 46 of the key, together with the print hammer 52 and the print medium 50.

In addition, the disk 150 which is opaque bears a mark 170 which serves as the hours hand while the disk 156 bears the mark 172 which serves as the minute hand. This solution makes the apparatus somewhat more complicated since it requires an additional display disk, however, it makes the strip easier to read since the disk 160 may include sixty print elements corresponding to sixty minutes.

In order to accommodate a wide range of shape and tolerance in the print elements 112, 34 and 36, the print hammer 42 may be split into two parts.

Figure 7:
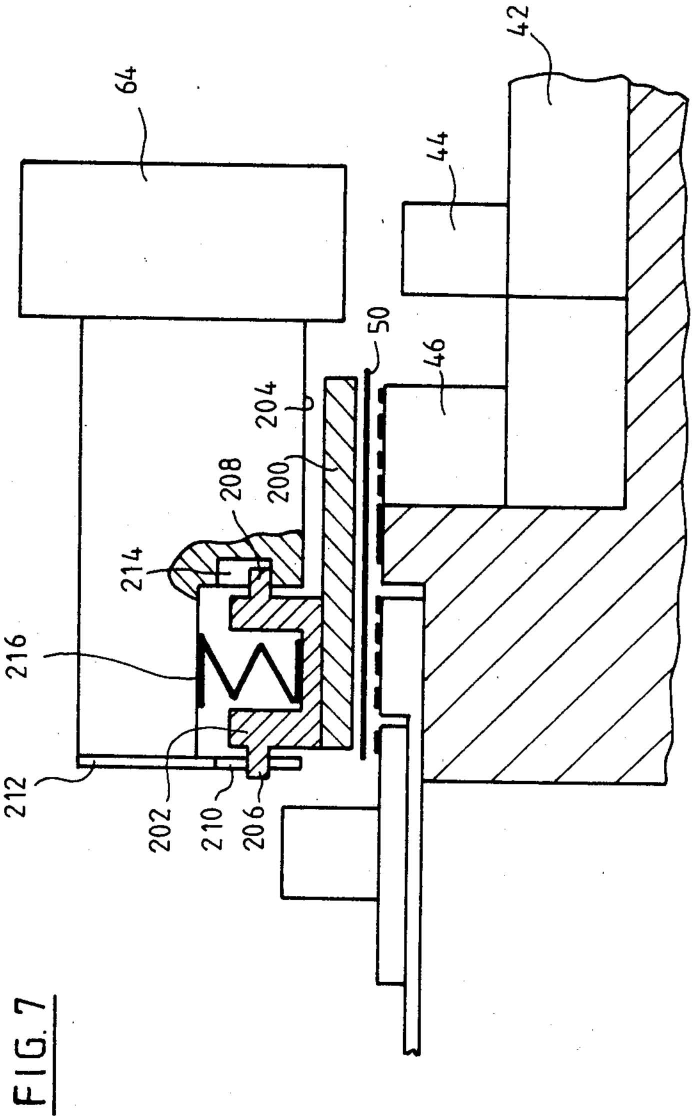
FIG. 7 shows a variant embodiment of the print means.

FIG. 7 shows the time printing elements 112 and 36 are struck by the hammer 200 by bearing against a riser 202 while the print elements 48 are struck by the hammer 200 bearing against the face 204 of the lever 64. In the rest position, the reference face of the hammer 200 belonging to the riser 202 is prepositioned at an angle and at a distance relative to the face 204 of the lever 64 by pins 206 and 208 belonging to the riser 202. These pins slide towards hollows 210 in the part 212 which is fixed to the lever 64 and in the hollow 214 in the lever 64, while a compression spring 216 bears against the lever 64 and the riser 202.

By a suitable selection of characteristics for the hammer 200, for its rest position relative to the face 204, and for the stiffness of the spring 16, it is possible to distribute the strike energy over the time elements 112 and 36 of the clock movement and over the elements 48 of the keys 42 in such a manner as to obtain a print quality which is independent of variations in the geometry and tolerance of the print elements.

It is clear from the above description that the structure of a watchman's clock in accordance with the invention is very simplified relative to the structure of similar prior art apparatus. In particular, the means for printing time data are reduced to a disk which is directly mounted on the hours shaft of a clock movement. Furthermore, since the print elements are disposed on one of the main faces of the disk, rather than being disposed around its rim, the disk is easy to mold.

I claim:

1. Apparatus for monitoring the times at which a watchman passes a plurality of given locations, the apparatus comprising a plurality of keys with each key being intended to be disposed at a respective one of said locations and being provided with a print element capable of identifying said location, the apparatus further comprising a portable recording device provided with a recording strip for simultaneously recording data representative of one of said locations together with the time of passage at said location, said portable recording device comprising a clock movement having at least an hours shaft, a disk which is fixed in rotation about said shaft and having print elements indicative of time data disposed around the periphery of one of its plane faces and facing said recording strip, said print elements being arranged for printing said time data on said strip, means enabling one of said keys to be inserted into said portable recording device and for positioning said identification element of said key therein, said identification element facing said recording strip when said key is so positioned, strip advancing means for causing said recording strip to advance by one step, said strip advancing means causing a new portion of said strip to be placed at each step facing one of said print elements on said disk and facing said identification element of said key, and means for causing simultaneous printing of the time data of one of said print elements and of the identification element on said portion of the strip.

2. Apparatus according to claim 1, wherein said means for causing simultaneous printing and said means for causing said strip to advance are controlled by a pivoting lever which cooperates with a cam, said cam being driven in rotation by rotating one of said keys after insertion into the portable recording device.

3. Apparatus according to claim 1, wherein said portable recording device includes a read window and a hand fixed to said hours shaft to display time data.

4. Apparatus according to claim 3, wherein the clock movement further includes a minutes shaft provided with a minutes hand which is visible through said window.

5. Apparatus according to claim 1, wherein said disk is provided with a mark for displaying time data.

6. Apparatus according to claim 1, wherein said print elements on said disk serve to print hours data, and wherein said apparatus further includes a minutes shaft and a second, transparent disk fixed to said minutes shaft and being provided around the periphery of one of its faces with further print elements for printing minutes data, both of said sets of print elements beind disposed in substantially the same plane perpendicular to said hours and minutes axes.

7. Apparatus according to claim 2, wherein said print means include a hammer mounted on said lever via a slider and return spring system, said return spring acting on that portion of said hammer which is disposed opposite to said time data print elements.

* * * * *